US 6,631,203 B2

(12) United States Patent
Ellis et al.

(10) Patent No.: US 6,631,203 B2
(45) Date of Patent: *Oct. 7, 2003

(54) HISTOLOGICAL RECONSTRUCTION AND AUTOMATED IMAGE ANALYSIS

(75) Inventors: Bob Ellis, Laguna Niguel, CA (US); William J. Decker, San Diego, CA (US); Gina McLaren, Laguna Niguel, CA (US)

(73) Assignee: ChromaVision Medical Systems, Inc., San Juan Capistrano, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/081,714

(22) Filed: Feb. 20, 2002

(65) Prior Publication Data

US 2002/0076092 A1 Jun. 20, 2002

Related U.S. Application Data

(63) Continuation of application No. 09/344,308, filed on Jun. 24, 1999, now Pat. No. 6,418,236.
(60) Provisional application No. 60/129,384, filed on Apr. 13, 1999.

(51) Int. Cl.[7] .................................................. G06K 9/00
(52) U.S. Cl. ...................................................... 382/128
(58) Field of Search ................................ 382/128, 133, 382/129, 130, 131, 132, 134, 308; 435/6, 7.23; 356/39

(56) References Cited

U.S. PATENT DOCUMENTS

| 3,824,393 A | 7/1974 | Brain |
| 3,851,972 A | 12/1974 | Smith et al. |
| 4,011,004 A | 3/1977 | Levine et al. |
| 4,125,828 A | 11/1978 | Resnick et al. |
| 4,342,905 A | 8/1982 | Fujii et al. |
| 4,393,466 A | 7/1983 | Deindoerfer et al. |
| 4,513,438 A | 4/1985 | Graham et al. |

(List continued on next page.)

FOREIGN PATENT DOCUMENTS

| DE | 3340647 A1 | 5/1985 |
| DE | 3735091 A1 | 4/1988 |
| EP | 0 557 871 A2 | 9/1993 |
| EP | 0 713 086 A1 | 5/1996 |
| WO | WO 92/17848 | 10/1992 |
| WO | WO 97/20198 | 6/1997 |

OTHER PUBLICATIONS

Ballard, D.H., et al., *Computer Vision*, Prentice Hall, Englewood Cliffs, New Jersey 07632, pp. 65–70 and 149–165.
Baxes, G.A., *Digital Image Processing, Principles and Applications*, John Wiley & sons, Inc., pp. 127–137.
Duda, R.O., et al., Pattern Classification and Scene Analysis, John Wiley & Sons, pp. 276–284 and pp. 229–239.
Hartelius, K., et al., "Bayesian Grid Matching", Institute of Mathematical Modelling Technical University of Denmark, Nov. 22, 2000.

(List continued on next page.)

*Primary Examiner*—Bhavesh M. Mehta
*Assistant Examiner*—Kanji Patel
(74) *Attorney, Agent, or Firm*—Fish & Richardson P.C.

(57) ABSTRACT

A method for automated image analysis of a biological specimen by histological reconstruction. Also provided is an automated cell image method for analyzing a biological specimen that has consecutively been stained by either an in situ hybridization (ISH) method, or an immunohistochemistry (IHC) method or a nucleic acid stain, and counterstained. The method couples composite images in an automated manner for processing and analysis. To identify structure in tissue that cannot be captured in a single field of view image or a single staining technique, the disclosure provides a method for histological reconstruction to analyze many fields of view on potentially many slides simultaneously.

27 Claims, 10 Drawing Sheets

U.S. PATENT DOCUMENTS

| | | |
|---|---|---|
| 4,612,614 A | 9/1986 | Deindoerfer et al. |
| 4,673,973 A | 6/1987 | Ledley |
| 4,700,298 A | 10/1987 | Palcic et al. |
| 4,945,220 A | 7/1990 | Mallory et al. |
| 4,991,223 A | 2/1991 | Bradley |
| 5,003,165 A | 3/1991 | Sarfati et al. |
| 5,016,173 A | 5/1991 | Kenet et al. |
| 5,085,325 A | 2/1992 | Jones et al. |
| 5,087,965 A | 2/1992 | Torre-Bueno |
| 5,202,931 A | 4/1993 | Bacus |
| 5,231,580 A | 7/1993 | Cheung et al. |
| 5,233,684 A | 8/1993 | Ulichney |
| 5,257,182 A | 10/1993 | Luck et al. |
| 5,268,966 A | 12/1993 | Kasdan |
| 5,287,272 A | 2/1994 | Rutenberg et al. |
| 5,333,207 A | 7/1994 | Rutenberg |
| 5,338,924 A | 8/1994 | Barrett et al. |
| 5,375,177 A | 12/1994 | Vaidyanathan et al. |
| 5,428,690 A * | 6/1995 | Bacus et al. ............... 382/128 |
| 5,432,871 A | 7/1995 | Novik |
| 5,449,622 A * | 9/1995 | Yabe et al. .................. 436/63 |
| 5,463,470 A | 10/1995 | Terashita et al. |
| 5,473,706 A | 12/1995 | Bacus et al. |
| 5,499,097 A | 3/1996 | Ortyn et al. |
| 5,526,258 A * | 6/1996 | Bacus ..................... 364/413.1 |
| 5,583,666 A | 12/1996 | Elison et al. |
| 5,586,160 A | 12/1996 | Mascio |
| 5,625,705 A | 4/1997 | Recht et al. |
| 5,635,402 A | 6/1997 | Alfano et al. |
| 5,646,677 A | 7/1997 | Reber |
| 5,647,025 A | 7/1997 | Frost et al. |
| 5,690,892 A * | 11/1997 | Babler et al. ................ 422/63 |
| 5,706,093 A | 1/1998 | Komiya |
| 5,726,009 A * | 3/1998 | Connors et al. ............... 435/4 |
| 5,740,267 A | 4/1998 | Echerer et al. |
| 5,740,270 A | 4/1998 | Rutenberg et al. |
| 5,783,814 A | 7/1998 | Fairley et al. |
| 5,795,723 A | 8/1998 | Tapscott et al. |
| 5,799,105 A | 8/1998 | Tao |
| 5,854,851 A | 12/1998 | Bamberger et al. |
| 5,889,881 A | 3/1999 | MacAulay et al. |
| 6,007,996 A * | 12/1999 | McNamara et al. ........... 435/6 |
| 6,058,322 A | 5/2000 | Nishikawa et al. |
| 6,101,265 A * | 8/2000 | Bacus et al. ............... 382/133 |
| 6,215,892 B1 | 4/2001 | Douglass et al. |
| 6,215,894 B1 | 4/2001 | Zeleny et al. |
| 6,226,392 B1 | 5/2001 | Bacus et al. |
| 6,313,452 B1 | 11/2001 | Paragano et al. |
| 6,418,236 B1 * | 7/2002 | Ellis et al. ................. 382/128 |
| 6,466,690 B2 | 10/2002 | Bacus et al. |

OTHER PUBLICATIONS

McKeogh, L.F., et al., "A Low–cost automatic translation and autofocusing system for a microscope", Measurement Science and technology, vol. 6, No. 5, pp. 583–587.

Roca, X., et al., "New autofocusing algorithm for cytological tissue ina microscopy environment", Optical Engineering, vol. 37, No. 2., pp. 635–641, Feb., 1998.

* cited by examiner

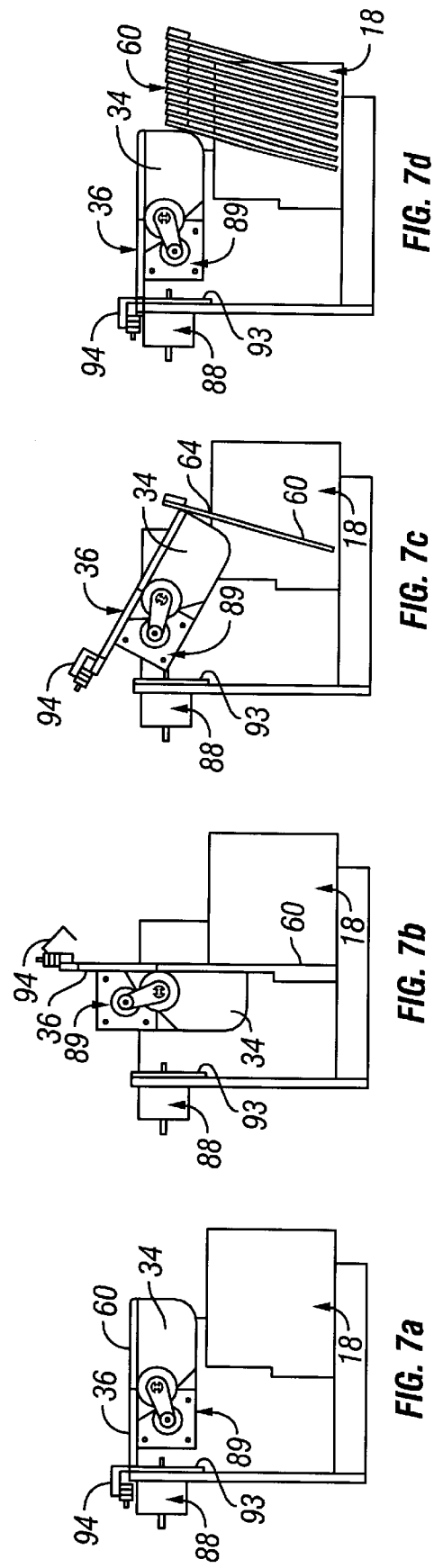

HISTOLOGICAL RECONSTRUCTION AND AUTOMATED IMAGE ANALYSIS

CROSS-REFERENCE TO RELATED APPLICATIONS

This application is a continuation of U.S. patent applications Ser. No. 09/344,308, filed Jun. 24, 1999, and now U.S. Pat. No. 6,418,236 B1 which claims the benefit of priority under 35 U.S.C. §119(e) of U.S. provisional Application No. 60/129,384, filed Apr. 13, 1999. The aforementioned applications are explicitly incorporated herein by reference in their entirety and for all purposes.

TECHNICAL FIELD

The invention relates generally to light microscopy and, more particularly, to automated techniques of analyzing cytochemical and immunohistochemical staining.

BACKGROUND OF THE INVENTION

In current cellular imaging systems, the area of a stained slide containing a stained cellular specimen is scanned by automated microscopy systems. The entire cellular specimen area of the slide is imaged with a series of field of view images. For further analysis, each field of view image must be separately analyzed to locate complete candidate objects of interest within the field of view image. This approach may be acceptable for cellular objects or clusters that are not so large that they extend beyond the field of view width or length of an image. Often, for both automated and manual analysis, only a single field of view is analyzed for morphological characteristics, so that the context of the analysis is limited to that field of view on a single slide.

SUMMARY OF THE INVENTION

A method for automated image analysis of a biological specimen is disclosed. A biological specimen is stained and counterstained for a specific marker or in the instance of immunohistochemistry or in situ hybridization, the marker is detectably labeled. Such labels include enzyme, radioisotopes, fluorescence or other labels well known in the art. The sample is then scanned at a plurality of positions by a photoimaging system to acquire an image. Adjacent positions are then used to reconstruct and provide a full picture image of the whole sample. A reconstructed whole sample image may then be further processed to identify coordinates that may have an object or area of interest. These coordinates are automatically selected for a candidate object of interest. In a preferred embodiment, a low magnification image of the candidate objects of interest is automatically obtained. Preferably the image is a color digital image. The candidate object of interest pixels in each sample are automatically morphologically processed to identify artifact pixels and the remaining candidate object of interest pixels in the sample not identified as artifact pixels. The apparatus obtaining the low magnification image is adjusted to a higher magnification, to acquire a higher magnification image of the sample, at the location coordinates corresponding to the low magnification image, for each candidate object or area of interest. Pixels of the higher magnification image in the first color space are automatically transformed to a second color space to differentiate higher magnification candidate objects of interest pixels from background pixels and identify, at higher magnification, objects of interest from the candidate object of interest pixels in the second color space. Thus, the pathologist or technician can identify whether the candidate object of interest has been specifically stained for the marker of interest, or counterstained, or both specifically stained and counterstained.

An automated cellular image method for analyzing a biological specimen, that has consecutively been stained with hematoxylin and eosin (H/E) on one tissue section and by one or several immunohistochemistry (IHC) and/or in situ hybridization (ISH) methods on parallel tissue sections, is also disclosed as a particular embodiment. To identify a structure in tissue that cannot be captured in a single field of view image or a single staining technique, the invention provides a method for histological reconstruction to analyze many fields of view on potentially many slides simultaneously. The method couples composite images in an automated manner for processing and analysis. A slide on which is mounted a biological specimen stained to identify structure of interest is supported on a motorized stage. An image of the biological specimen is generated, digitized, and stored. As the viewing field of the objective lens is smaller than the entire biological specimen, a histological reconstruction is made. These stored images of the entire tissue section may then be placed together in an order such that the H/E stained slide is paired with the immunohistochemistry slide so that analysis of the images may be performed simultaneously by the pathologist. The images may be superimposed or viewed as adjacent images.

In one embodiment, the invention provides a method for automated image analysis of a biological specimen by providing a biological sample to be analyzed, automatically scanning the sample at a plurality of coordinates, automatically obtaining an image at each of the coordinates, reconstructing an image of the sample from each individual image to create a reconstructed image and processing the reconstructed image to identify a candidate object or area of interest.

In another embodiment, the invention provides a method for histological reconstruction. In this method a sample of a biological specimen is divided into a number of subsamples. Each subsample is processed with a stain, counterstain, immunohistochemical technique, in situ hybridization technique, or a combination thereof. Each sample is then scanned and an image is obtained from each of the samples. The images are then reconstructed such that a first image is paired with a consecutive-corresponding sample image for identification of objects or areas of interest.

In yet another embodiment, the invention provides a computer program residing on a computer-readable medium, for automated image analysis of a biological specimen. The computer program comprises instructions for causing a computer to process a sample by scanning the sample at a plurality of coordinates, obtaining an image at each of the coordinates, reconstructing the sample from the individual images to create a reconstructed sample, identifying a coordinate of a candidate object or area of interest in the reconstructed image and acquiring an image at the coordinate obtained from the reconstructed image.

DESCRIPTION OF THE DRAWINGS

FIG. 5 shows a slide carrier. FIG. 5b is a bottom view of the slide carrier of FIG. 5a.

FIG. 6 shows views of an automated slide handling subsystem.

FIGS. 7a–7d illustrate the output operation of the automated slide handling subsystem.

DETAILED DESCRIPTION

Overview

Figure 1:
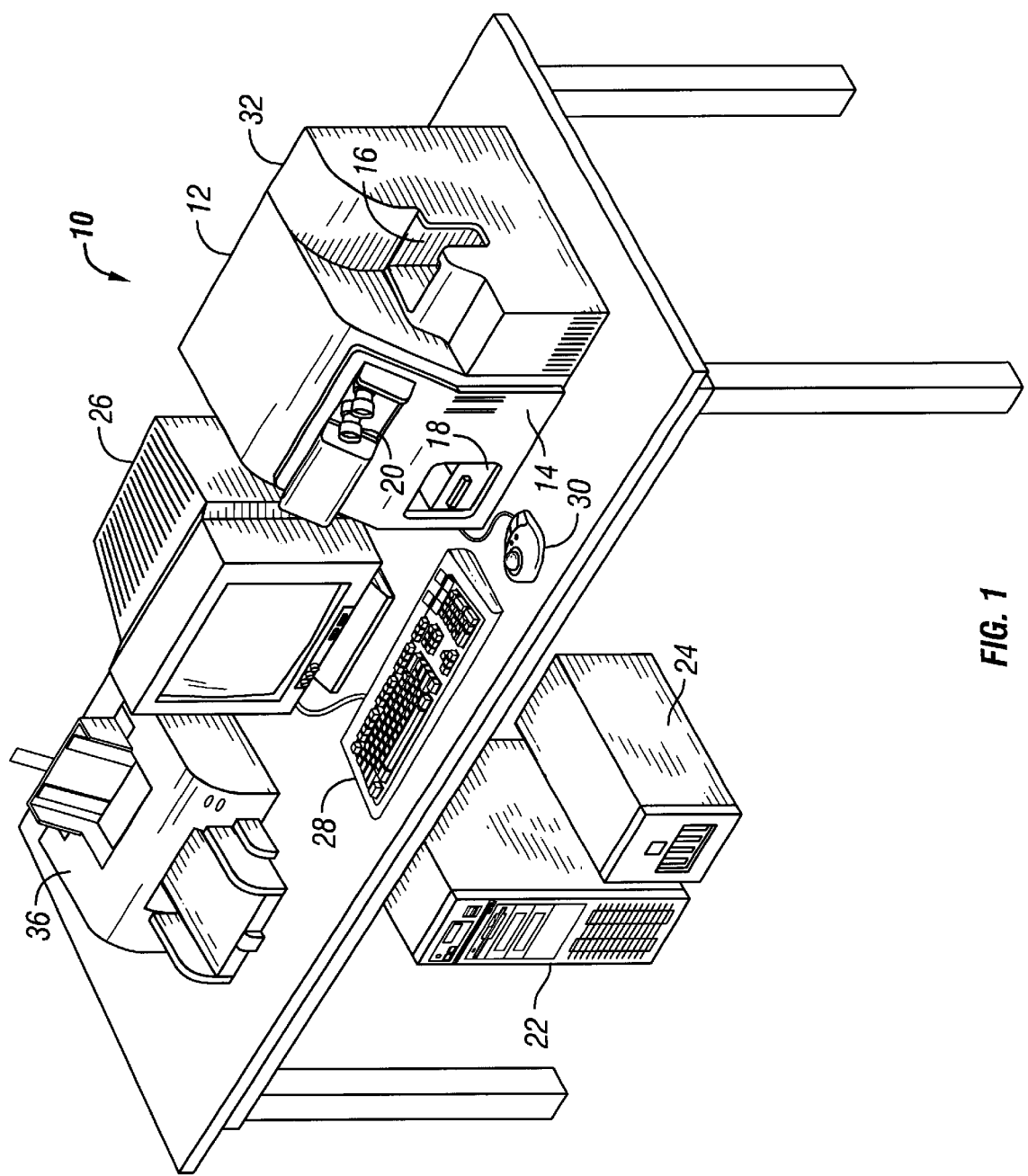
FIG. 1 is a perspective view of an apparatus for automated cell image analysis.
Figure 2:
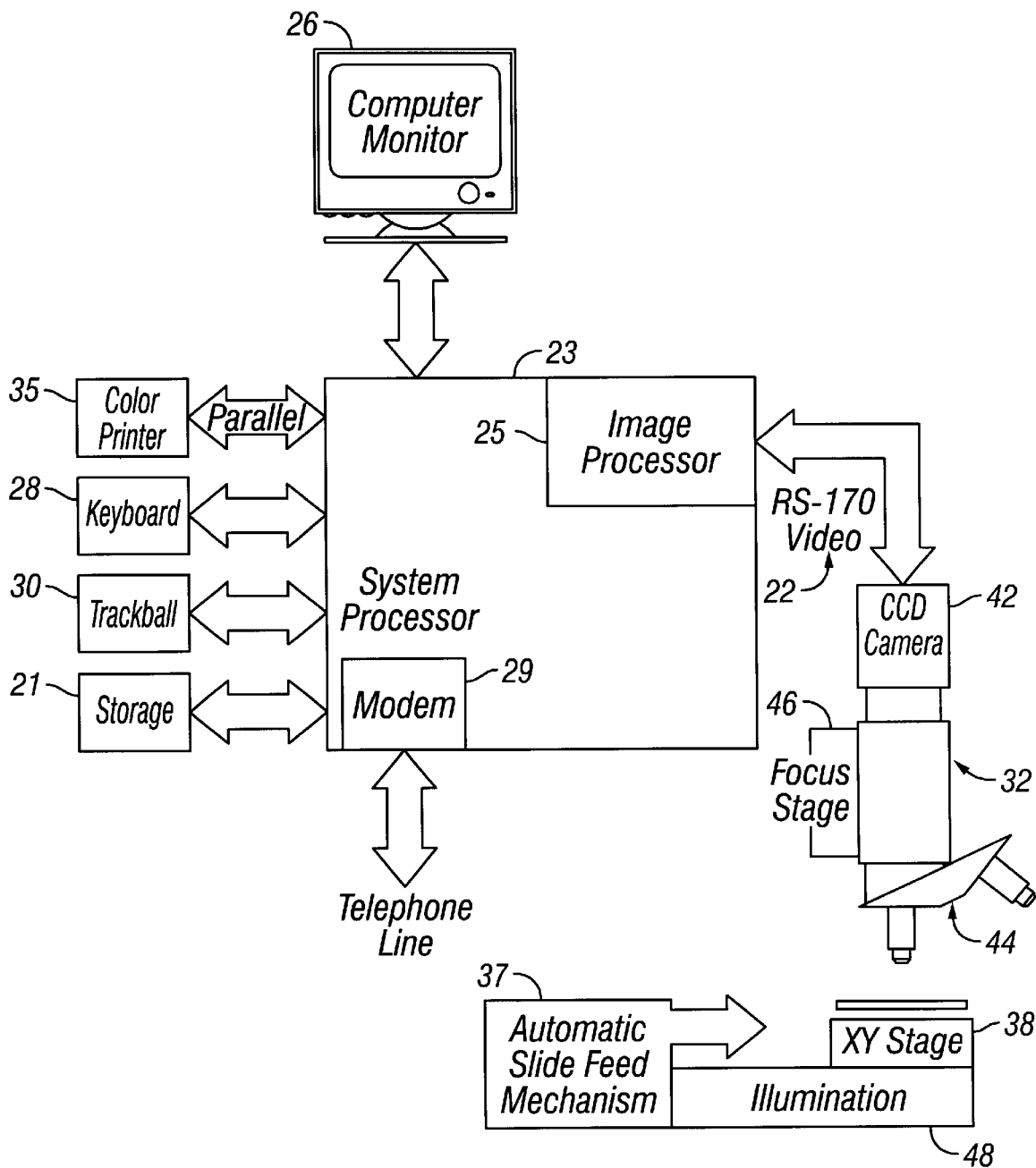
FIG. 2 is a block diagram of the apparatus shown in FIG. 1.
Figure 3:
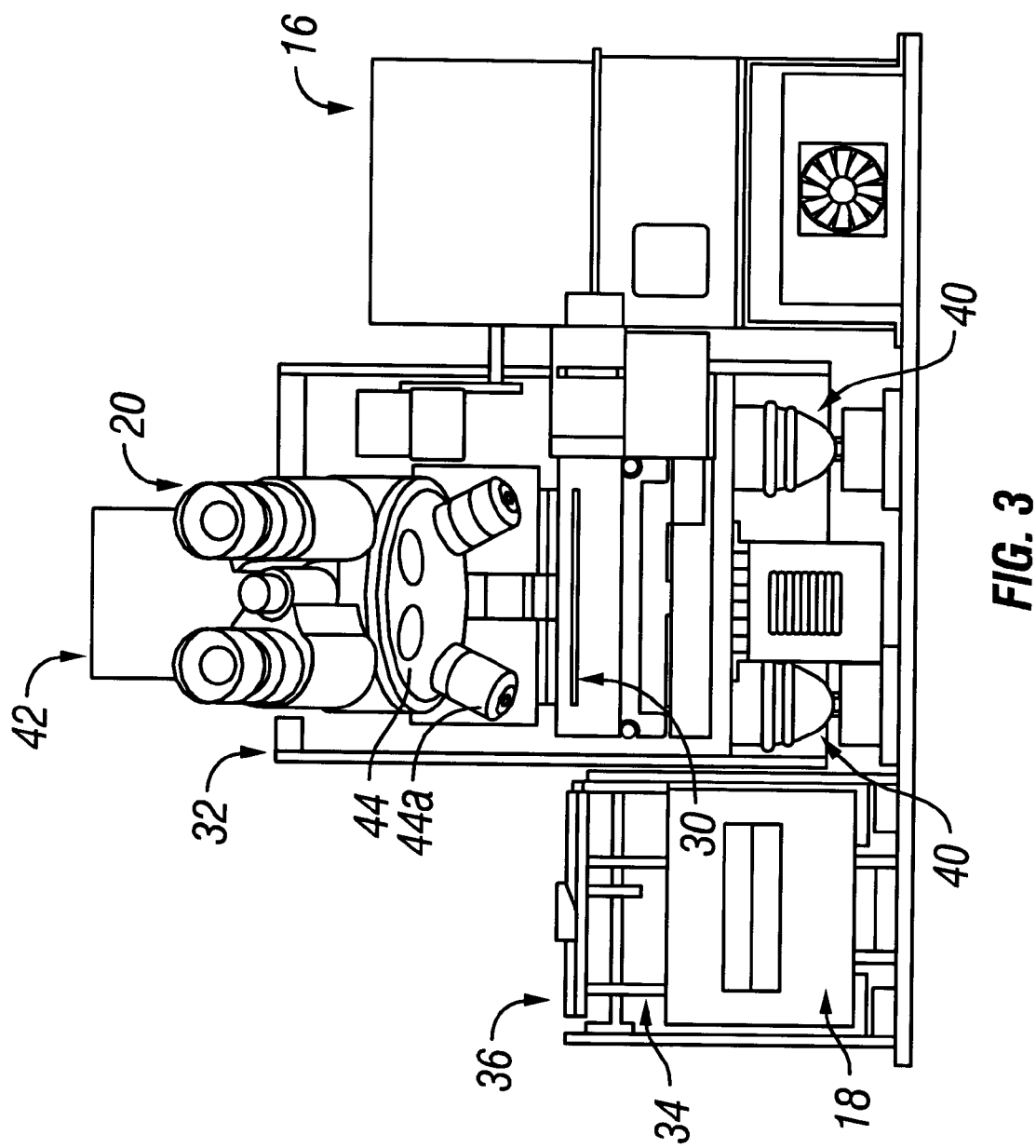
FIG. 3 is a plan view of the apparatus of FIG. 1 having the housing removed.

An automated microscope for analyzing cellular specimens is shown in FIGS. 1 and 3 and in block diagram in FIG. 2. A motorized stage 38 may be used to support a slide 70 (FIG. 5). On the slide is mounted a biological specimen that is typically stained to identify a structure of interest for analysis. A biological specimen is defined as a cellular or acellular sample of biological origin, which has been mounted on a microscope slide. The biological specimen can be, for example, a tissue section, a biological fluid specimen, for example, a blood fraction cytospun on a microscope slide or a cell suspension directly seeded on a slide.

At least one optical sensing array, such as an objective lens, 44a is located above the stage and a light source 48 is located beneath the stage. Light from the source illuminates the stage and slide so an image of the biological specimen is generated by the optical sensing array, for example an objective lens. This image is stored in memory. Preferably the image is a digitized or digital image. As the viewing field of the optical array is smaller than the entire biological specimen, the stage is moved in one planar direction by a distance that corresponds to the length of the field of view in that direction. The image generated at that position may then be captured and stored. The acquired image may be flipped along its centerline due to the optical flipping of the original image. Movement of the stage and capture of resulting image continue in the same direction until the end of the specimen area of the slide is reached. At that time, the stage is moved in the other planar direction by a distance that corresponds to the length of the field of view in that direction and another image is generated and stored. The slide is traversed or scanned in this manner until the entire specimen area of the slide has been viewed through the objective lens. These stored images may then be placed together in the order in which they were collected to generate a composite or reconstructed image of the cellular specimen. This composite image may then be analyzed to detect a structure that extends across more than one image field or more than one slide for further analysis. Such analysis may result in the identification of a candidate object or area of interest in both the field of view as well as objects that overlap two or more fields of view. In such instances, the system will automatically determine the coordinates for these candidate objects and may obtain additional images at various magnifications.

In existing cellular imaging systems, the area of the slide is scanned by automated microscopy systems to image the entire specimen area of the slide with a series of field of view images in the manner described above. However, these systems require that each field of view image is separately analyzed to locate complete candidate objects of interest within the field of view image for further analysis. This approach is acceptable for cellular objects that are not so large that they extend beyond the field of view width or length of an image. To identify structure in tissue that cannot be captured in a single field of view image, the present system uses an analysis method to identify field of view images that appear to contain part of a tissue structure to be analyzed. Field of view images so identified that are adjacent to one another are then identified as containing the tissue structure that the stain, antibody, or probe was intended to identify. This portion of the composite image may then be viewed under a higher magnification power for additional detail. The automatic building of a composite specimen image from the field of view images and the processing of the composite image or its constituent images to identify tissue structure that extends beyond one field of view is unknown.

In addition, a problem with existing automated systems is the continued need for operator input to initially locate cell objects for analysis. Such continued dependence on manual input can lead to errors including objects of interest being missed. These errors can be critical especially in assays for so-called rare events, e.g., finding one stained cell in a cell population of one million normal cells. Additionally, manual methods can be extremely time consuming and can require a high degree of training to properly identify or quantify cells. The associated manual labor leads to a high cost for these procedures in addition to the potential errors that can arise from long, tedious manual examinations. A need exists, therefore, for an improved automated cell image analysis system which can quickly and accurately scan large amounts of biological material on a slide.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below.

Nuclear Stains, Intercalating Dyes and Counterstains

The term "nuclear stain" refers to a cytochemical stain that preferentially stains the nuclei of eukaryotic cells. Many nuclear stains are intercalating dyes. The term "intercalating dye" refers to a chemical compound that can insert itself in between adjacent nucleotides of a nucleic acid to provide a detectable color.

Many nuclear stains are known in the art, with one of the most commonly used being hematoxylin. Hematoxylin is often used in combination with various metallic salts (mordants). Hematoxylin stains are used for different staining purposes, and have a variety of colors, depending on the metal used. Aluminum lakes are purple to blue, depending on pH. Iron lakes are blue-black. Chromium lakes are blue-black. Copper lakes are blue-green to purple. Nickel lakes are various shades of violet. Tin lakes are red. Lead lakes are dark brown. Osmium lakes are greenish brown. Other nuclear stains include Giemsa stain, methyl green (which binds to AT-rich DNA regions), and Nuclear Fast-Red.

Fluorescent stains include Hoechst 33342; Hoechst 33258 (Calbiochem), a bisbenzimide DNA intercalator that excites in the near UV (350 nm) and emits in the blue region (450 nm); thiazole orange, a fluorogenic stain for DNA that excites in the blue region (515 nm) and emits in the green region (530 nm) of the visible spectrum; DAPI; ethidium bromide; propidium iodide; TOTO; YOYO-1; and SYTOX Blue or Green stains are also encompassed by the current invention. Several dyes either bind GC-rich or AT-rich chromosomal regions preferentially or show differences in fluorescence intensity upon binding those regions, yielding fluorescent banding patterns. For example, 7-Aminoactinomycin D binds selectively to GC-rich DNA regions and. 9-Amino-6-chloro-2-methoxyacridine fluoresces with greatest intensity in AT-rich DNA regions. Acridine homodimer fluoresces preferentially when bound to AT-rich DNA regions.

The term "counterstain," when used in combination with nuclear stains, refers to cytochemical stains that bind to a region of a eukaryotic cell other than the nucleus. Many counterstains are known in the art. One of the most common is eosin, which stains eukaryotic cell cytoplasm to varying shades of pink. Other counterstains are specific for a particular organelle or a protein in a cell. For example, the Kleihauer-Betke cytochemical stain is specific for hemoglobin F, a hemoglobin type preferentially expressed in fetal cells and therefore can be defined as a specific marker of fetal red blood cells.

The term "coordinate" or "address" is used to mean a particular location on a slide or sample. The coordinate or address can be identified by any number of means including, for example, X-Y coordinates, r-P coordinates, and others recognized by those skilled in the art.

In one embodiment, an automated cellular imaging method is used to identify fetal nucleated red blood cells in a maternal blood specimen. Fetal cells are first identified following the Kleihauer-Betke cytochemical stain for hemoglobin F. Fetal cells are identified by the automated cellular imaging system as objects on the basis of their bright red color (indicative of Hemoglobin F) as compared to maternal red blood cells. To assure that appropriate objects are identified, size and shape morphological "filters" are used to exclude very small and very large objects.

Cells are counterstained with an additional cytochemical stain for nucleic acids, resulting in a blue color for nucleated red blood cells (generally, fetal red blood cells). An automated image analysis system identifies blue objects of the appropriate size and shape for an erythrocyte nucleus among the bright red objects, allowing the imaging system to identify and enumerate nucleated fetal red cells. Such cells can be enumerated, allowing for a screen for Down's syndrome in the fetus, wherein the frequency of such cells is typically higher in Down's syndrome pregnancies compared with normal pregnancies.

In a preferred embodiment, the slides are stained with hematoxylin/eosin (H/E) and one or several parallel slides containing adjacent sections are stained for one or several specific markers.

The results of the H/E staining provide cells with nuclei stained blue-black, cytoplasm stained varying shades of pink; muscle fibers stained deep pinky red; fibrin stained deep pink; and red blood cells stained orange-red.

For example, hematoxylin/eosin (H/E) slides are prepared with a standard H/E protocol. Standard solutions include the following: (1) Gills hematoxylin (hematoxylin 6.0 g; aluminum sulphate 4.2 g; citric acid 1.4 g; sodium iodate 0.6 g; ethylene glycol 269 ml; distilled water 680 ml); (2) eosin (eosin yellowish 1.0 g; distilled water 100 ml); (3) lithium carbonate 1% (lithium carbonate 1 g; distilled water 100 g);
(4) acid alcohol 1% 70% (alcohol 99 ml conc.; hydrochloric acid 1 ml); and (5) Scott's tap water. In a beaker containing 1 L distilled water, add 20 g sodium bicarbonate and 3.5 g magnesium sulphate. Add a magnetic stirrer and mix thoroughly to dissolve the salts. Using a filter funnel, pour the solution into a labeled bottle.

The staining procedure is as follows: (1) Bring the tissue or cell sections to water; (2) place sections in hematoxylin for 5 minutes (min); (3) wash in tap water; (4) 'blue' the sections in lithium carbonate or Scott's tap water; (5) wash in tap water; (6) place sections in 1% acid alcohol for a few seconds; (7) wash in tap water; (8) place sections in eosin for 5 min; (9) wash in tap water; and (10) dehydrate with graded alcohol solution.

Mount Sections

A specific marker is a molecule or a group of molecules, which is present in only a subset of the components of a biological specimen and therefore identifying specifically the components having the marker. Specific markers are frequently defined as antigens recognized by specific antibodies (monoclonals or polyclonals) and can be detected by immunohistochemistry. Another group of specific markers is defined by the capacity of these markers to hybridize, specifically, a nucleic acid probe. These markers can usually be detected by in situ hybridization. A third group of specific markers can be defined by their enzymatic activity and can be detected by histochemistry. A fourth group of specific markers can be stained directly, histochemically, using a specific dye.

A fifth group of specific markers can be defined as being receptors binding specifically to one or several ligands. A specific ligand is itself used for the detection of the receptor-ligand complex, using a detection method involving either histochemistry, or immunohistochemistry or in situ hybridization.

Immunohistochemical and in Situ Hybridization Techniques

Immunohistochemical techniques as used herein encompasses the use of reagents detecting cell specific markers, such reagents include, for example, as antibodies and nucleic acids probes. Antibodies, including monoclonal antibodies, polyclonal antibodies and fragments thereof, are often used to identify proteins or polypeptides of interest in a sample. A number of techniques are utilized to label objects of interest according to immunohistochemical techniques. Such techniques are discussed in Current Protocols in Molecular Biology, Unit 14 et seq., eds. Ausubel, et al., John Wiley & Sons, 1995, the disclosure of which is incorporated herein by reference. For example, the following procedure is an example of immunohistochemical staining using an antibody recognizing, specifically, the HER2 protein. HER2 overexpression has been described as a specific marker in a high percentage of breast cancer carcinomas. This protocol is intended for staining a paraffin embedded tissue section prepared according to a conventional procedure.

The section is deparaffinized using two baths of xylene and rehydrated through graded alcohols baths and finally in deionized water. The section is then incubated with an Antigen Retrieval Buffer, containing Citrate, for 40 minutes at 95° C. The slide is then cooled down at room temperature for 20 minutes in the same buffer. The slide is then rinsed in deionized water.

The area surrounding the tissue section is carefully dried and a hydrophobic delimiting pen is used to draw a line around the specimen, on the glass slide. A peroxidase blocking solution is added on the section and incubated 5 minutes at room temperature. After being washed twice with the Wash Buffer (a balanced salt solution), the tissue section is incubated 30 minutes at room temperature, with the primary antibody recognizing the HER2 protein.

After 3 washes with the Wash Buffer, the tissue section is incubated with the peroxidase conjugated secondary antibody. The secondary antibody will recognize specifically the primary antibody. The slide is then washed 3 times with the Wash Buffer. Then the tissue section is incubated in presence of DAB and hydrogen peroxide for 10 minutes, before being washed with water.

The tissue section is counterstained in Hematoxylin for 2 minutes and rinsed again with water. The slide is mounted with a cover-slip using an aqueous mounting medium.

Immunohistochemical localization of cellular molecules uses the ability of antibodies to bind specific antigens, for example proteins of interest such as onco-proteins and enzymes, with high affinity. These antibodies can be used to localize antigens to subcellular compartments or individual cells within a tissue.

In situ hybridization techniques include the use of specifically labeled nucleic acid probes, which bind to cellular RNA or DNA in individual cells or tissue section. Suitable nucleic acid probes may be prepared using standard molecular biology techniques including subcloning, plasmid preparation, and radiolabeling or non-radioactive labeling of the nucleic acid probe.

In situ hybridization is often performed on either paraffin or frozen sections. Such techniques often include fine sectioning of tissues to provide samples that are only a single to a few cell layers thick. For example paraffin blocks containing a tissue sample are cut into thin, approximately 8 um tissue sections, which are subsequently mounted on subbed slides to be further processed for in situ hybridization. Alternatively, methacrylate may be used for sectioning. Cryosectioning techniques are particularly suitable for immunohistochemistry and enzyme histochemistry.

Immunofluorescent labeling of a tissue section often use a sandwich assay or a primary antibody and secondary antibody-fluorochrome conjugate. Slides containing a tissue section of interest are washed in phosphate buffered saline and then exposed to a primary antibody which will bind to the protein object of interest. Subsequently the slides are washed and exposed to the secondary antibody which binds to the first or primary antibody. The slide is washed and then developed. Numerous other techniques well known in the art of immunohistochemical staining and in situ hybridization are easily adaptable for use in immunohistochemical reconstruction as disclosed herein.

Thus, a combination of techniques using both chemical staining and/or immunohistochemical and/or in situ hybridization may be used in the present methods. For example, numerous subsamples may be prepared from a single tissue specimen. A first subsample may be chemically stained as discussed above, and a subsequent subsample may be subjected to immunohistochemical and in situ hybridization techniques. Each subsamples is scanned and processed as discussed below. Reconstructed images may then be overlapped or processed to further identify objects of interest.

Histological Reconstruction

Histological reconstruction is a process whereby an image of a whole specimen is constructed from analyzed pieces of the specimen, particularly when the biological specimen has been mounted on a slide. This image is created by piecing together more than one field of view at any particular magnification.

Figure 10:
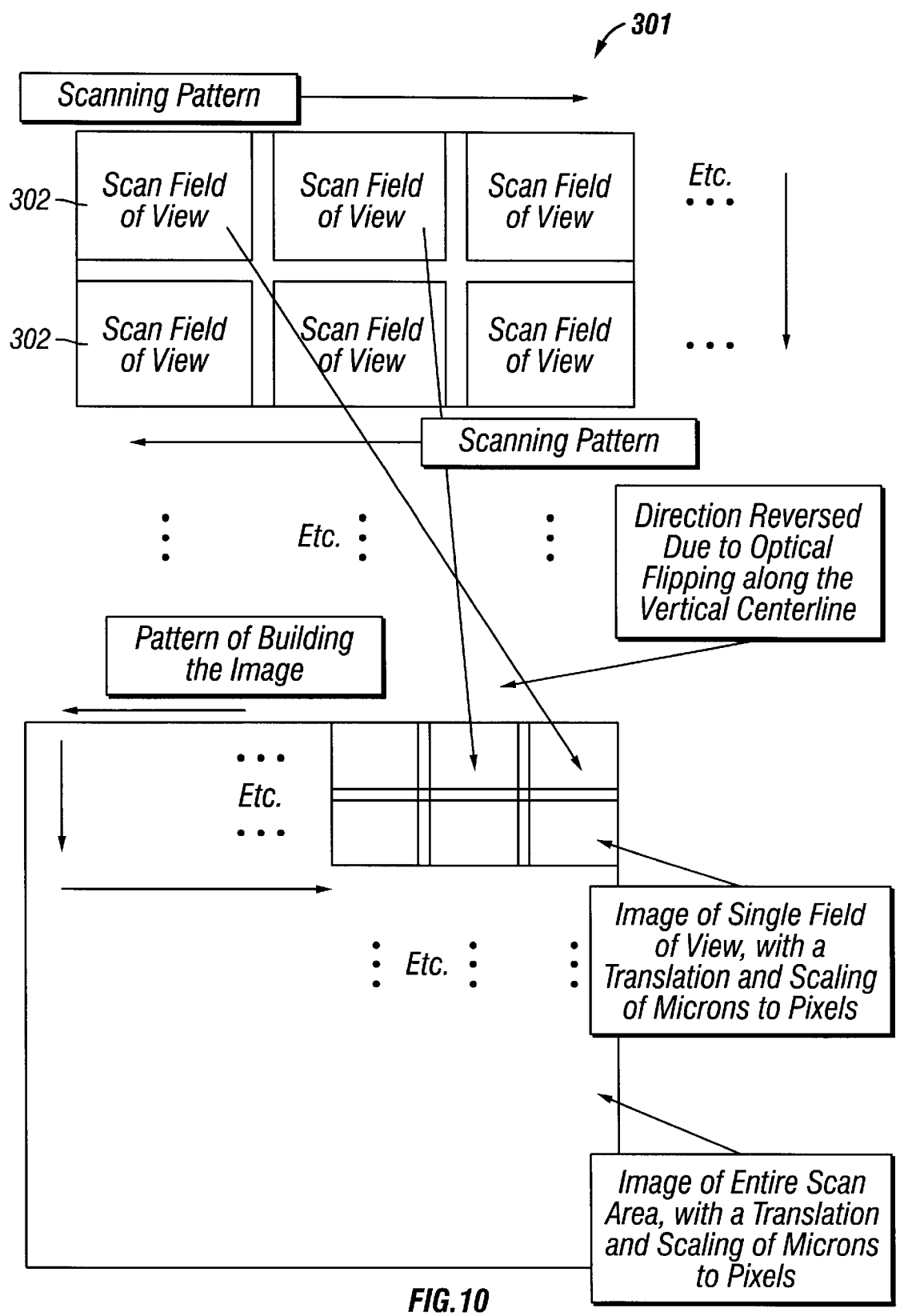
FIG. 10 shows a method of histological reconstruction.

With reference to FIG. 10, an image 302, representing an objective's field of view is acquired at a first particular coordinate on the slide sample 301. The slide is automatically repositioned on the X-Y stage to obtain a new or second field of view corresponding to a second particular coordinate 302. This new field of view is preferably immediately adjacent to the first field of view, however, so long as the coordinates, thus the address/identity, of each field of view are retained in the imaging system, histological reconstruction may be performed. This process is repeated until images for the whole of the specimen have been acquired.

Based upon each image's X and Y coordinate, the specimen is digitally reconstructed. As part of the reconstruction, the image may be flipped to correct for the optical flipping of the original image.

The process of forming a histological reconstructed image involves having the apparatus scan a microscope slide of interest, and form the image that constitutes a reconstruction of the images taken during the scan. The image that is formed can be a full-color reconstruction of the entire scan area, or a fraction of the whole scan area, for example, reconstruction of the entire scan area that identifies objects or areas of interests. The reconstructed digital image can then be used for further processing or analysis to identify previously undetected objects or areas of interest. For example, objects or areas of interest overlapping one or more fields of view or slides may thus be identified in the reconstructed digital image.

With reference to FIGS. 1 and 2, the apparatus 10 also referred to as the system, comprises a microscope 32 with a motorized X, Y and Z stage 38, a camera 42, a computer 22 adapted to receive and process video images, and a set of software programs to control the apparatus and to execute the method. A measurement of the optical properties of the sample features is used to form an image of the scannable area of the slide, to find sub-regions of interest, and to analyze the properties of these regions. The image processing method that evaluates the sample to find regions of interest uses a measure of the hue, saturation or intensity and luminosity of a 24-bit color image to produce a white on black target image of interest. This image is processed by separately converting the full color image to components of hue, saturation or intensity and luminosity, thresholding the components, and performing a logical "AND" between the two images, then thresholding the resulting image such that any pixel value above zero becomes 255. The processing and image acquisition will be further understood with reference to the apparatus described below.

Automated System

The invention provides a method for automated analysis of a biological specimen, which eliminates the need for operator input to locate biological objects or areas of interest for analysis.

With reference to FIG. 1, a slide prepared with a biological specimen and reagent is placed in a slide carrier 60 (FIG. 5) which preferably holds four slides. The slide carriers are loaded into an input hopper 16 of the automated system 10. The operator then enters data identifying the instrument protocol which contains information on the size, shape and location of a scan area on each slide, or, preferably, the system automatically locates a scan area for each slide during slide processing. The operator then activates the system 10 for slide processing. At system activation, a slide carrier 60 is positioned on an X-Y stage 33 of an optical system, such as microscope subsystem 32. Any bar codes used to identify slides are read and stored for at a low magnification, typically 10×. At each location of the scan, a low magnification image is acquired and processed to detect candidate objects or areas of interest, preferably, color, size and shape are used to identify objects or areas of interest. The location of each candidate object or area of interest may be stored by reference to its coordinates or address. Each field of view may also be stored as part of a larger composite image (described in detail elsewhere).

At the completion of the low level scan for each slide in the carrier on the stage, the optical system may be adjusted to a higher magnification such as 40× or 60×, for additional specimen processing and image acquisition, and the X-Y stage is positioned to the stored locations for the candidate objects or areas of interest on each slide in the carrier. A higher magnification image is acquired for each candidate object or area of interest and a series of image processing steps are performed to confirm the analysis, which was performed at low magnification. A higher magnification image is stored for each continued object or area of interest. These images are then available for retrieval by a pathologist or cytotechnologist to review for final diagnostic evaluation. Having stored the location of each object or area of interest, a mosaic comprising the candidate objects or areas of interest for a slide may be generated and stored. The pathologist or cytotechnologist may view the mosaic or may also directly view the slide at the location of an object or area of interest in the mosaic for further evaluation. The mosaic may be stored on magnetic or optical media for future reference or may be transmitted to a remote site for review or storage. The entire process involved in examining a single slide takes on the order of 4–100 min depending on scan area size and the number of detected candidate objects of interest.

The invention has utility in prenatal diagnosis of fetal cells, rare event detection, rapid cell counting, tissue evaluation, and other diagnoses.

The processing of images acquired in the automated scanning preferably includes the steps of transforming the image to a different color space, here preferably by hue, saturation and intensity. The pixels of the filtered image are dynamically thresholded to suppress background material; performing a morphological function to remove artifacts from the thresholded image; analyzing the thresholded image to determine the presence of one or more regions of connected pixels having the same color; and categorizing every region having a size greater than a minimum size as a candidate object or area of interest.

According to another aspect, the scan area is automatically determined by scanning the slide; acquiring an image at each slide position; analyzing texture or color information for each image to detect the edges of the specimen and storing the locations corresponding to the detected edges to define the scan area.

According to yet another aspect, automated focusing of the optical system is achieved by initially determining a focal surface from an array of points or locations in the scan area. The derived focal surface enables subsequent rapid automatic focusing in the low power scanning operation. In one embodiment, the focal plane is determined by determining proper focal positions across an array of locations and performing a least squares fit of the array of focal positions to yield a focal plane across the array. Preferably, a focal position at each location is determined by incrementing the position of a Z stage for a fixed number of coarse and fine iterations. At each iteration, an image is acquired and a pixel variance, morphological gradient or other optical parameter about a pixel mean for the acquired image is calculated to form a set of evaluation data. The peak value of the least squares fit curve is selected as an estimate of the best focal position.

In another aspect, a focal position method for a higher magnification locates a region of interest centered about a candidate object of interest within a slide which was located during an analysis of the low magnification images. The region of interest is preferably n columns wide, where n is a power of 2. The pixels of this region are then processed using a Fast Fourier Transform to generate a spectra of component frequencies and corresponding complex magnitude for each frequency component. Preferably, the complex magnitude of the frequency components which range from 25% to 75% of the maximum frequency component are squared and summed to obtain the total power for the region of interest. This process is repeated for other Z positions and the Z position corresponding to the maximum total power for the region of interest is selected as the best focal position. This focal method can be used with many stains and types of cellular specimens.

According to still another aspect, a method for automated slide handling is provided. A slide is mounted onto a slide carrier 60 (FIG. 5) with a number of other slides side-by-side. The slide carrier 60 is positioned in an input feeder 16 with other slide carriers to facilitate automatic analysis of a batch of slides. The slide carrier is loaded onto the X-Y stage 38 of the optical system 32 for the analysis of the slides thereon. Subsequently, the first slide carrier is unloaded into an output feeder 18 after automatic image analysis and the next carrier is automatically loaded.

Referring to the FIGURES, an apparatus for automated cell image analysis of biological specimens is generally indicated by reference numeral 10 as shown in perspective view in FIG. 1 and in block diagram form in FIG. 2. The apparatus 10 comprises a microscope subsystem 32 housed in a housing 12. The housing 12 includes a slide carrier input hopper 16 and a slide carrier output hopper 18. A door 14 in the housing 12 secures the microscope subsystem from the external environment. A computer subsystem comprises a computer 22 having two system processors 23, an image processor 25 and a communications modem 29. The computer subsystem further includes a computer monitor 26 and an image monitor 27 and other external peripherals including storage device 21, pointing device 30, keyboard 28 and color printer 35. An external power supply 24 is also shown for powering the system. Viewing oculars 20 of the microscope subsystem project from the housing 12 for operator viewing. The apparatus 10 further includes a 3-chip CCD camera 42 for acquiring images through the microscope subsystem 32. The computer directly controls a number of microscope subsystem functions described further in detail.

An automatic slide feed mechanism 37 in conjunction with X-Y stage 38 provide automatic slide handling in the apparatus 10. An illumination light source 48 projects light onto the X-Y stage 38 which is subsequently imaged through the microscope subsystem 32 and acquired through the 3-chip CCD camera 42 for processing by the image processor 25. A Z stage or focus stage 46 under control of the microscope controller 31 provides displacement of the microscope subsystem in the Z plane for focusing. The microscope subsystem 32 further includes a motorized objective turret 44 for selection of objectives.

The apparatus 10 is for the unattended automatic scanning of prepared microscope slides for the detection and counting of candidate objects or areas of interest, such as stained cells. In one embodiment the invention may be utilized for tissue analysis. In another embodiment, rare event detection in which there may be only one candidate object of interest per several hundred thousand normal cells, e.g., one to five candidate objects of interest per 2 square centimeter area of the slide. The apparatus 10 automatically locates and counts candidate objects or areas of interest and estimates normal cells present in a cellular specimen on the basis, for example, of color, size and shape characteristics. A biological specimen may be prepared with a reagent to obtain a colored insoluble precipitate. The apparatus, in one embodiment, is used to detect this precipitate as a candidate object or area of interest.

During operation of the apparatus 10, a pathologist or laboratory technician mounts prepared slides onto slide carriers. A slide carrier 60 is illustrated in FIG. 5 and is described further below. Each slide carrier holds up to 4 slides. Up to 25 slide carriers are then loaded into input hopper 16. The operator can specify the size, shape and location of the area to be scanned or alternatively, the system can automatically locate this area. The operator then commands the system to begin automated scanning of the slides through a graphical user interface. Unattended scanning begins with the automatic loading of the first carrier and slide onto the motorized X-Y stage 38. A bar code label affixed to the slide is read by a bar code reader 33 during this loading operation. Each slide is then scanned at a user selected low microscope magnification, for example, 10×, to build a histological reconstruction or identify candidate objects based on their color, size and shape characteristics. The X-Y locations of candidate objects or areas of interest are stored until scanning is completed.

After the low magnification scanning is completed, the apparatus may automatically return to each candidate object or area of interest, if necessary, reimaging and refocusing at a higher magnification such as 40× and performs further analysis to confirm the biological candidate. The apparatus stores an image of the object or area of interest for later review by a pathologist. All results and images can be stored to a storage device 21 such as a removable hard drive or optical disc or DAT tape or transmitted to a remote site for review or storage. The stored images for each slide can be viewed in a mosaic of images for further review. In addition, the pathologist or operator can also directly view a detected object or area of interest through the microscope using the included oculars 20 or on image monitor 27.

The two system processors 102 further control an illumination controller 106 for control of substage illumination 48. The light output from, for example, a halogen light bulb, which supplies illumination for the system, can vary over time due to bulb aging, changes in optical alignment, and other factors. In addition, slides which have been "over stained" can reduce the camera exposure to an unacceptable level. To compensate for these effects, the illumination controller 106 is included. This controller is used in conjunction with light control software to compensate for the variations in light level. The light control software samples the output from the camera at intervals (such as between loading of slide carriers), and commands the controller to adjust the light level to the desired levels. In this way, light control is automatic and transparent to the user and adds no additional time to system operation.

The system processors 23 are preferably comprised of dual parallel Intel Pentium Pro 400 MHZ devices. The image processor 25 is preferably a Matrox Genesis board. The computer, in a preferred embodiment, operates under Windows NT. It will be recognized that any number of processors and operating systems can be used in the methods and in conjunction with the present invention.

Figure 4:
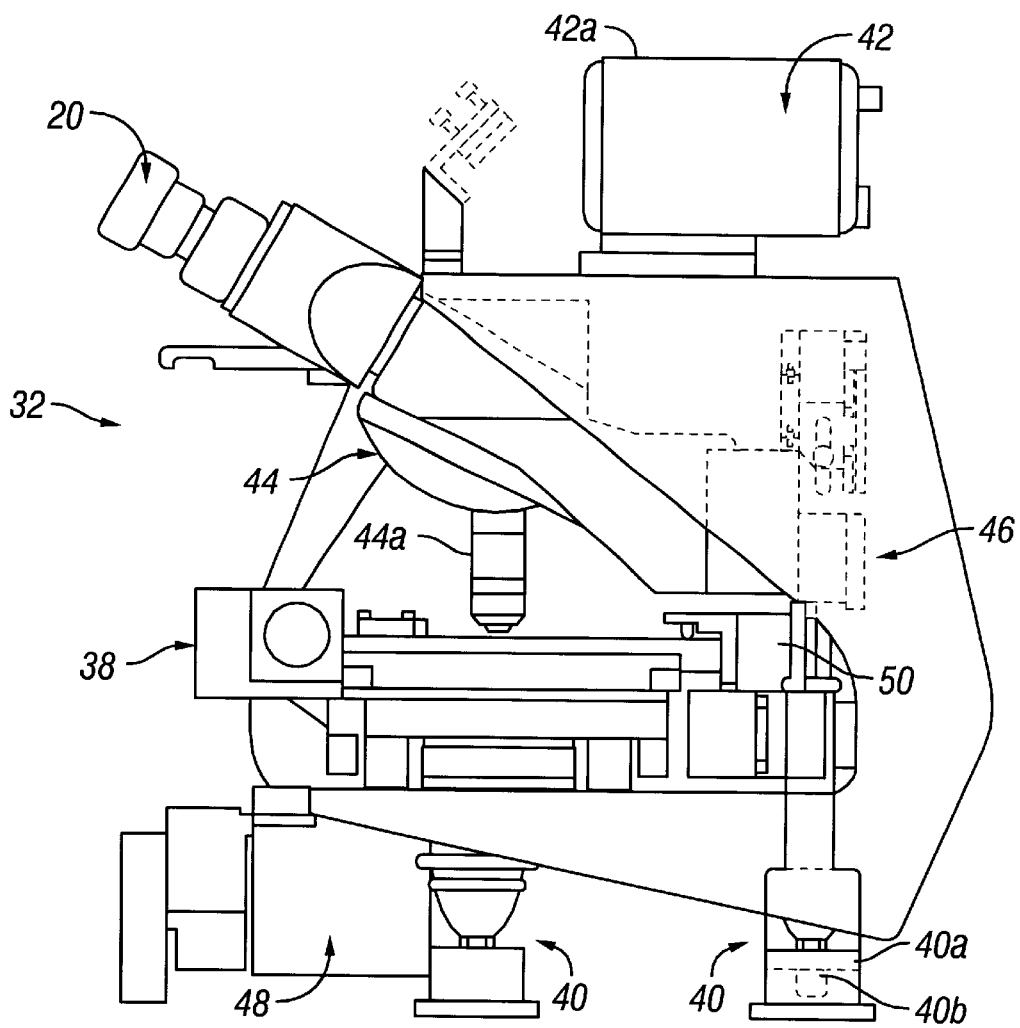
FIG. 4 is a side view of a microscope subsystem of the apparatus of FIG. 1.

Referring now to FIGS. 3 and 4, further detail of the apparatus 10 is shown. FIG. 3 shows a plan view of the apparatus 10 with the housing 12 removed. A portion of the automatic slide feed mechanism 37 is shown to the left of the microscope subsystem 32 and includes slide carrier unloading assembly 34 and unloading platform 36 which in conjunction with slide carrier unloading hopper 18 function to receive slide carriers which have been analyzed.

Vibration isolation mounts 40, shown in further detail in FIG. 4, are provided to isolate the microscope subsystem 32 from mechanical shock and vibration that can occur in a typical laboratory environment. In addition to external sources of vibration, the high speed operation of the X-Y stage 38 can induce vibration into the microscope subsystem 32. Such sources of vibration can be isolated from the electro-optical subsystems to avoid any undesirable effects on image quality. The isolation mounts 40 comprise a spring 40a and piston 40b submerged in a high viscosity silicon gel which is enclosed in an elastomer membrane bonded to a casing to achieve damping factors on the order of 17% to 20%.

Figure 5B:
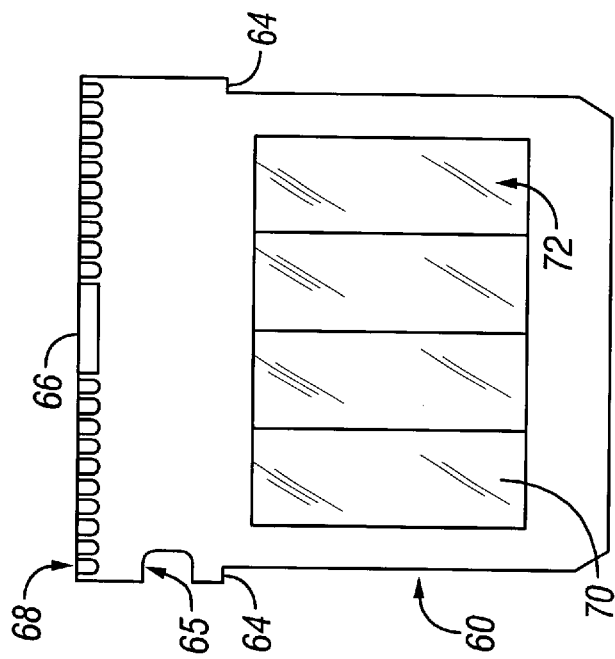
Figure 5A:
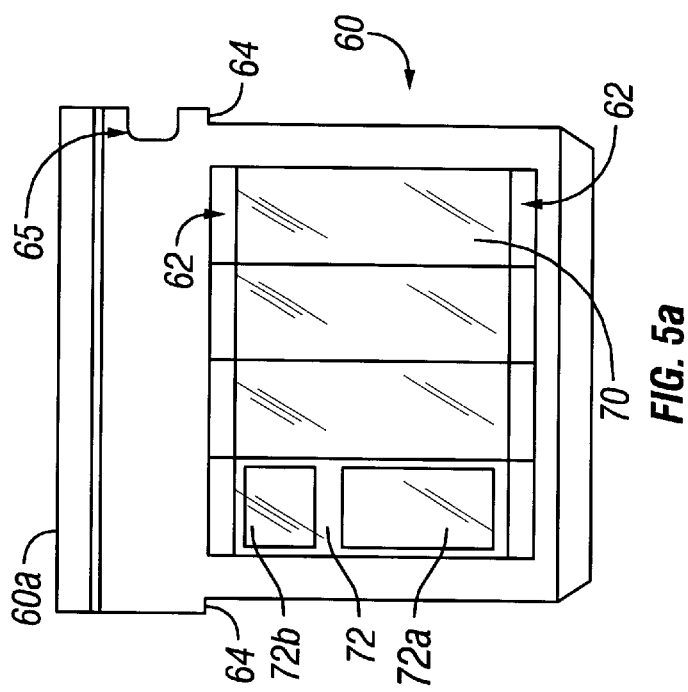
FIG. 5a is a top view of a slide carrier for use levity the apparatus of FIG. 1.

The automated slide handling subsystem operates on a single slide carrier at a time. A slide carrier 60 is shown in FIGS. 5a & 5b, which provide a top view and a bottom view respectively. The slide carrier 60 includes up to four slides 70 mounted with adhesive tape 62. The carrier 60 includes ears 64 for hanging the carrier in the output hopper 18. An undercut 66 and pitch rack 68 are formed at the top edge of the slide carrier 60 for mechanical handling of the slide carrier. A keyway cutout 65 is formed in one side of the carrier 60 to facilitate carrier alignment. A prepared slide 72 mounted on the slide carrier 60 includes a sample area 72a and a bar code label area 72b.

Figure 6A:
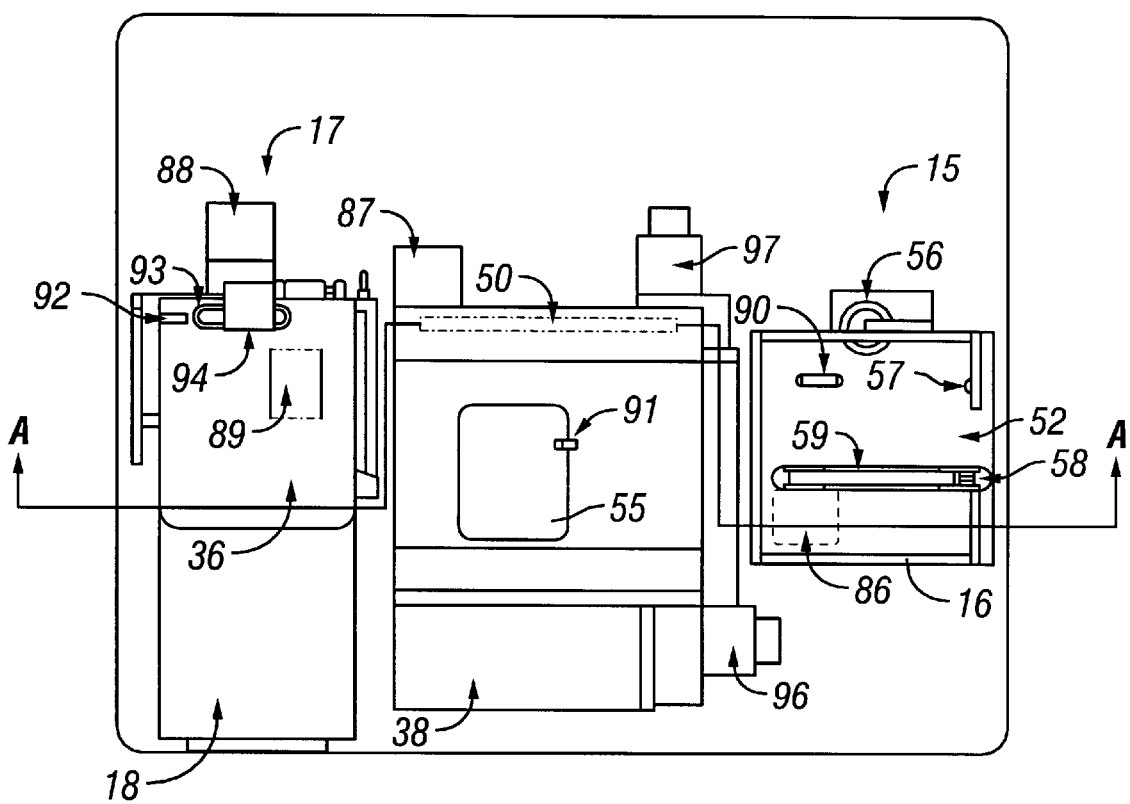
FIG. 6a is a top view of an automated slide handling subsystem of the apparatus of FIG. 1.
Figure 6B:
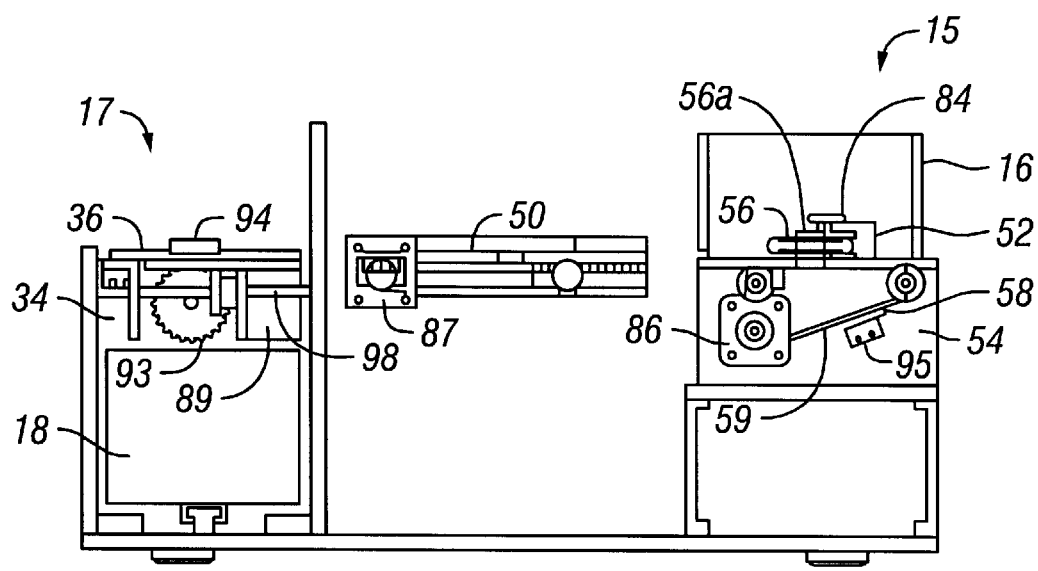
FIG. 6b is a partial cross-sectional view of the automated slide handling subsystem of FIG. 6a taken on line A—A.

FIG. 6a provides a top view of the slide handling subsystem which comprises a slide input module 15, a slide output module 17 and X-Y stage drive belt 50. FIG. 6b provides a partial cross-sectional view taken along line A—A of FIG. 6a.

The slide input module 15 includes a slide carrier input hopper 16, loading platform 52 and slide carrier loading subassembly 54. The input hopper 16 receives a series of slide carriers 60 (FIGS. 5a and 5b) in a stack on loading platform 52. A guide key 57 protrudes from a side of the input hopper 16 to which the keyway cutout 65 (FIG. 5a) of the carrier is fit to achieve proper alignment.

The input module 15 further includes a revolving indexing cam 56 and a switch 90 mounted in the loading platform 52, the operation of which is described further below. The carrier subassembly 54 comprises an infeed drive belt 59 driven by a motor 86. The infeed drive belt 59 includes a pusher tab 58 for pushing the slide carrier horizontally toward the X-Y stage 38 when the belt is driven. A homing switch 95 senses the pusher tab 58 during a revolution of the belt 59.

Figure 9:
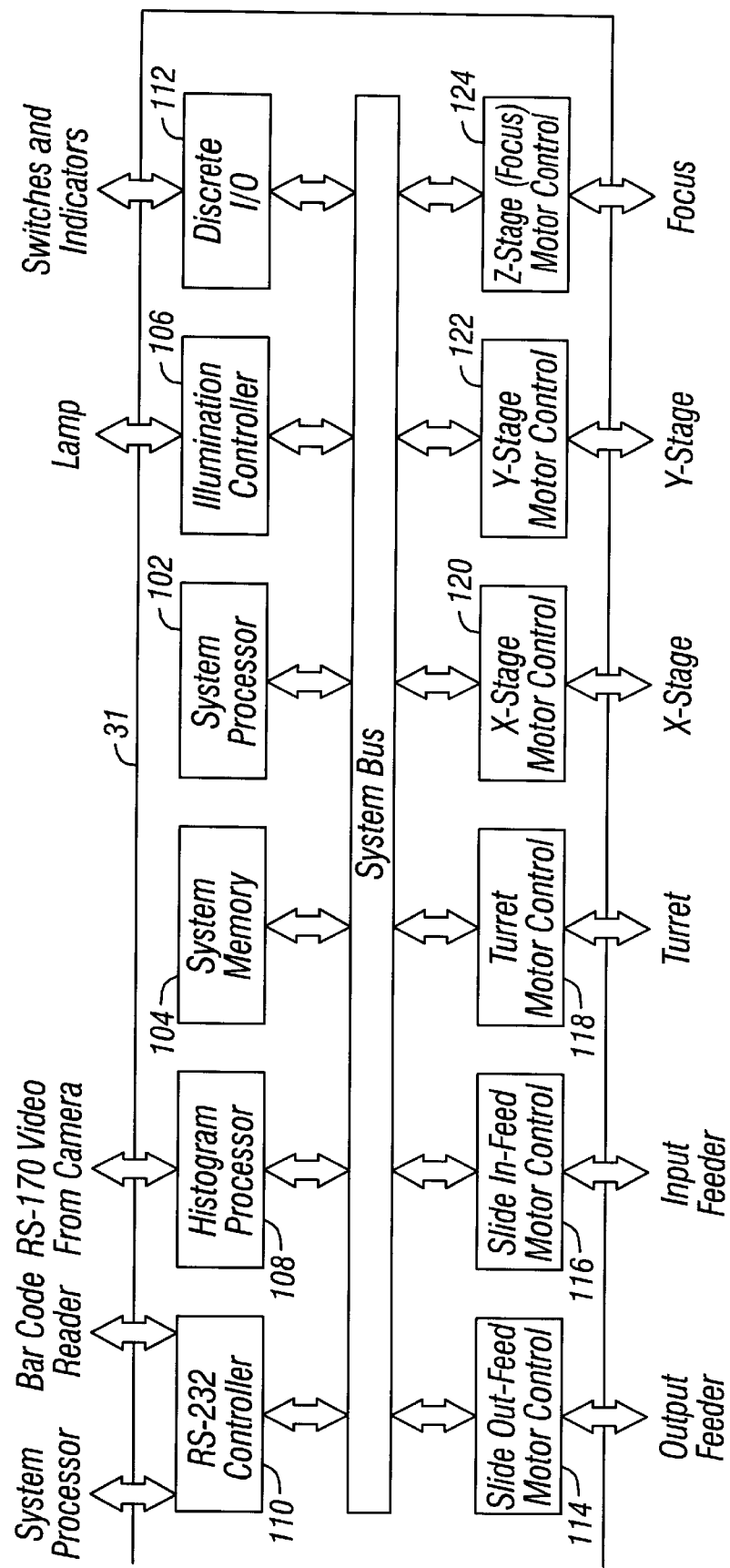
FIG. 9 is a block diagram of the microscope controller of FIG. 2

Referring specifically to FIG. 6a, the X-Y stage 38 is shown with x position and y position motors 96 and 97 respectively which are controlled by the microscope controller 31 (FIG. 9) and are not considered part of the slide handling subsystem. The X-Y stage 38 further includes an aperture 55 for allowing illumination to reach the slide carrier. A switch 91 is mounted adjacent the aperture 55 for sensing contact with the carrier and thereupon activating a motor 87 to drive stage drive belt 50 (FIG. 6b). The drive belt 50 is a double-sided timing belt having teeth for engaging pitch rack 68 of the carrier 60 (FIG. 5b).

The slide output module 17 includes slide carrier output hopper 18, unloading platform 6, and slide carrier unloading subassembly 34. The unloading subassembly 34 is a motor 89 for rotating the unloading platform 36 about shaft 98 during an unloading operation described further below. An outfeed gear 93 driven by motor 88 rotatably engages the pitch rack 68 of the carrier 60 (FIG. 5b) to transport the carrier to a rest position against switch 92. A spring loaded hold-down mechanism holds the carrier in place on the unloading platform 36.

The slide handling operation is now described. Referring to FIG. 7, a series of slide carriers 60 are shown stacked in input hopper 16 with the top edges 60a aligned. As the slide handling operation begins, the indexing cam 56 driven by motor 85 advances one revolution to allow only one slide carrier to drop to the bottom of the hopper 16 and onto the loading platform 52.

Figure 8:
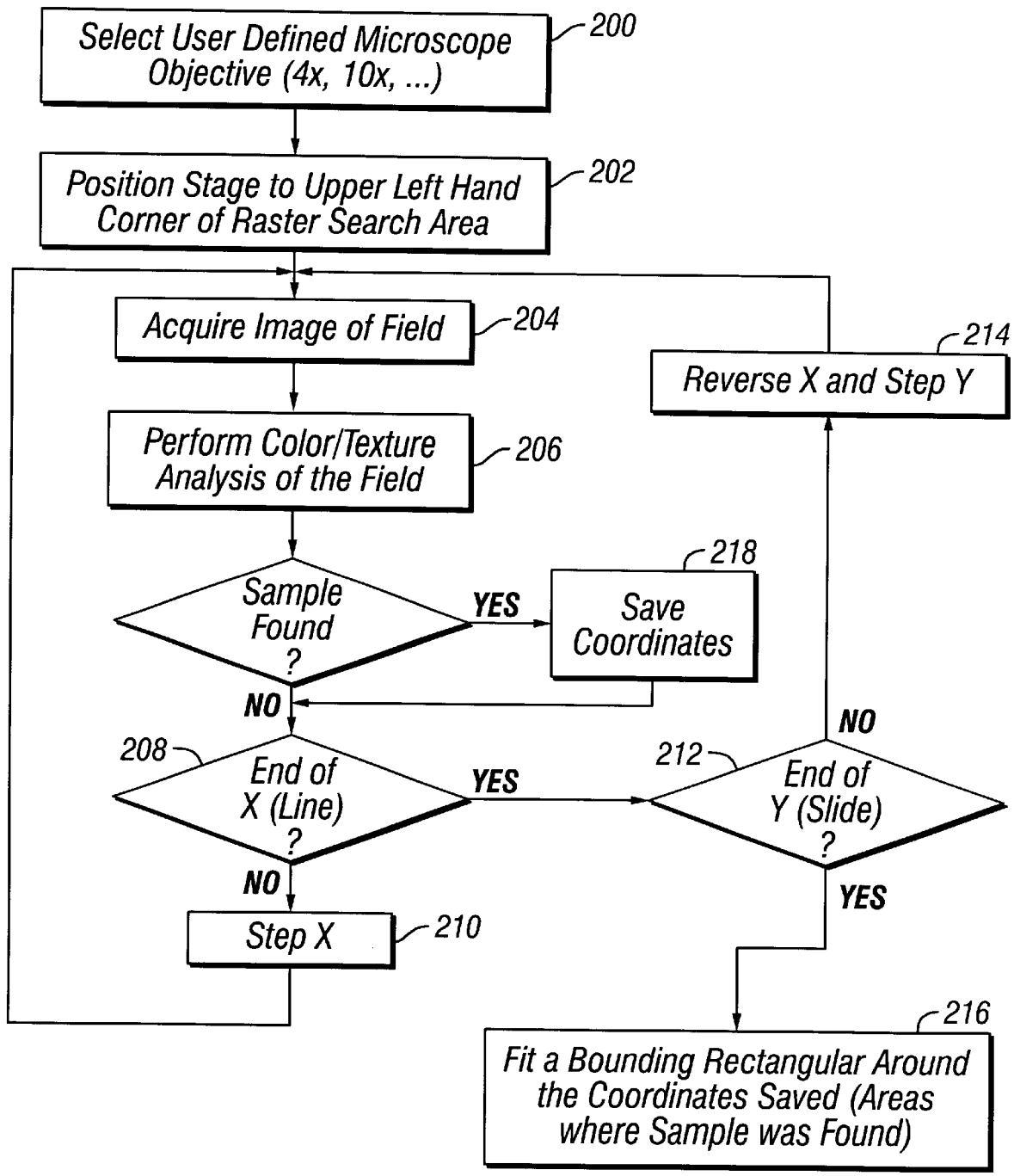
FIG. 8 is a flow diagram of the procedure for automatically determining a scan area.

FIGS. 7a–7d show the cam action in more detail. The indexing cam 56 includes a hub 56a to which are mounted upper and lower leaves 56b and 56c respectively. The leaves 56b & 56c are semicircular projections oppositely positioned and spaced apart vertically. In a first position shown in FIG. 8a, the upper leaf 56b supports the bottom carrier at the undercut portion 66. At a position of the indexing cam 56 rotated 180°, shown in FIG. 7b, the upper leaf 56b no longer supports the carrier and instead the carrier has dropped slightly and is supported by the lower leaf 56c. FIG. 8c shows the position of the cam 56 rotated 270° wherein the upper leaf 56b has rotated sufficiently to begin to engage the undercut 66 of the next slide carrier while the opposite facing lower leaf 56c still supports the bottom carrier. After a full rotation of 360° as shown in FIG. 7d, the lower leaf 56c has rotated opposite the carrier stack and no longer supports the bottom carrier which now rests on the loading platform 52. At the same position, the upper leaf 56b supports the next carrier for repeating the cycle.

Referring again to FIGS. 6a & 6b, when the carrier drops to the loading platform 52, the contact closes switch 90 which activates motors 86 and 87. Motor 86 drives the infeed drive belt 59 until the pusher tab 58 makes contact with the carrier and pushes the carrier onto the X-Y stage drive belt 50. The stage drive belt 50 advances the carrier until contact is made with switch 91, the closing of which begins the slide scanning process described further herein. Upon completion of the scanning process, the X-Y stage 38 moves to an unload position and motors 8, and 88 are activated to transport the carrier to the unloading platform 36 using stage drive belt 50. Motor 88 drives outfeed gear 93 to engage the carrier pitch rack 68 of the carrier 60 (FIG. 5b) until switch 92 is contacted. Closing switch 92 activates motor 89 to rotate the unloading platform 36.

The unloading operation is shown in more detail in end views of the output module 17 (FIGS. 7a–7d). In FIG. 7a, the unloading platform 36 is shown in a horizontal position supporting a slide carrier 60. The hold-down mechanism 94 secures the carrier 60 at one end. FIG. 7b shows the output module 17 after motor 89 has rotated the unloading platform 36 to a vertical position, at which point the spring loaded hold-down mechanism 94 releases the slide carrier 60 into the output hopper 18. The carrier 60 is supported in the output hopper 18 by means of ears 64 (FIGS. 5a and 5b). FIG. 7c shows the unloading platform 16 being rotated back towards the horizontal position. The platform 36 rotates upward and contacts the deposited carrier 60. The upward movement pushes the carrier toward the front of the output hopper 18. FIG. 7d shows the unloading platform 36 at its original horizontal position after having output a series of slide carriers 60 to the output hopper 18.

The aspects of the apparatus 10 relating to scanning, focusing and image processing are further described in patent application Ser. No. 08/758,436 which is incorporated herein.

Computer Implementation

Aspects of the invention may be implemented in hardware or software, or a combination of both. However, preferably, the algorithms and processes of the invention are implemented in one or more computer programs executing on programmable computers each comprising at least one processor, at least one data storage system (including volatile and non-volatile memory and/or storage elements), at least one input device, and at least one output device. Program code is applied to input data to perform the functions described herein and generate output information. The output information is applied to one or more output devices, in known fashion.

Each program may be implemented in any desired computer language (including machine, assembly, high level procedural, or object oriented programming languages) to communicate with a computer system. In any case, the language may be a compiled or interpreted language.

Each such computer program is preferably stored on a storage media or device (e.g., ROM, CD-ROM, tape, or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, various modifications may be made without departing from the spirit and scope of the invention. Accordingly, the invention is not to be limited by the specific illustrated embodiment, but only by the scope of the appended claims.

What is claimed:

1. A method for automated image analysis of a sample, comprising:
   automatically scanning one or more samples through an imaging field of an imaging system to obtain a plurality of different images that correspond to different position coordinates, each image having information of at least a portion of said one or more samples;
   processing imaging signals from the imaging system to produce digital data of the different images;
   digitally synthesizing the images to reconstruct a composite image which has data from the different images;
   automatically detecting a target of interest on the sample by automatically measuring one or more parameters of the sample and automatically comparing the measured parameters against selected threshold values of the parameters for the target of interest; and
   extracting information of the target of interest in the composite image.

2. The method as in claim 1, further comprising:
   operating an imaging system at a first magnification to obtain a first set of the different images and a first reconstructed image;

setting the imaging system at a second magnification greater than the first magnification to obtain a second set of the different images and a second reconstructed image;

using the first composite image to identify a target therein; and using the second composite image to extract desired information about the target.

3. The method as in claim 2, wherein the target has a dimension greater than the imaging field of the imaging system.

4. The method as in claim 1, further comprising automatically adjusting a light level of illumination in the imaging system, according to the degree of staining in the samples, so as to maintain the exposure at an unacceptable level.

5. A system for automated image analysis of a biological specimen, comprising:
(a) a slide handling mechanism that provides a biological sample to be analyzed;
(b) a microscope subsystem that
  (1) automatically scans the sample at a plurality of different positions with different coordinates; and
  (2) automatically obtains an image at each of said different coordinates to produce different images from different locations of the sample; and
(d) an image processor that
  (1) automatically detects one or more targets of interest on the sample from the different images of the sample by automatically measuring one or more parameters of the sample and automatically comparing the measured parameters against selected threshold values of the parameters for the targets of interest;
  (2) automatically reconstructs an image of a selected target on the sample from the obtained different images, wherein a reconstructed image of a selected target spreading in two or more spatially adjacent and different images of the sample is reconstructed by using image information from the spatially adjacent and different images; and
  (3) processes the reconstructed image to obtain information of the selected target of interest.

6. The system of claim 5, wherein the reconstructed image of the sample is a digital image.

7. The system of claim 5, wherein the image processor is configured to:
automatically identify a coordinate of a candidate object or area of interest in the reconstructed image; and
automatically acquire a selected image of the object or area of interest, at the location coordinates obtained from the reconstructed image, wherein the selected image includes image information from two different images obtained at two different coordinates during the scanning.

8. The system of claim 5, wherein the image processor is configured to:
receive from the microscope subsystem a first set of the different images and a first reconstructed image at a first magnification;
receive from the microscope subsystem a second set of the different images and a second reconstructed image at a second magnification greater than the first magnification;
use the first reconstructed image to identify a target therein; and
use the second reconstructed image to extract desired information about the target.

9. The system of claim 8, wherein the target has a dimension greater than the imaging field of the microscope subsystem.

10. The system of claim 5, further comprising an illumination controller that automatically adjusts a light level of illumination in the microscope subsystem, according to the degree of staining in the samples, so as to maintain the exposure at an unacceptable level.

11. The system of claim 5, further comprising vibration isolation mounts that include a spring and a piston submerged in a high viscosity silicon gel which is enclosed in an elastomer membrane bonded to a casing.

12. The system of claim 5, wherein the target of interest is detected by immunohistochemistry.

13. The system of claim 5, wherein the target of interest is detected by in situ hybridization.

14. The system of claim 5, wherein the target of interest is detected by a stain.

15. The system of claim 14, wherein the stain is a nucleic acid dye selected from the group consisting of hematoxylin, Giemsa stain, methyl green, Nuclear Fast-Red, Hoechst 33342, Hoechst 33258, thiazole orange, DAPI, ethidium bromide, propidium iodide, TOTO, YOYO-1, SYTOX Blue, SYTOX Green, 7-Aminoactinomycin, 9-Amino-6-chloro-2-methoxyacridine, and acridine homodimer.

16. The system of claim 14, wherein the target of interest is stained with a cytoplasmic dye such as eosin or Kleihauer-Betke cytochemical stain or a combination thereof.

17. The system of claim 15, wherein the target of interest is a cell specific marker.

18. The system of claim 17, wherein the cell specific marker is detected by a nuclear stain and counterstain.

19. The system of claim 17, wherein the cell specific marker is detected by immunohistochemistry, in situ hybridization, staining or a combination thereof.

20. A system comprising:
(a) a slide handling mechanism that automatically loads and unloads a plurality of slide carriers to provide the system a biological sample for analysis;
(b) a microscope subsystem that automatically scans the sample through an imaging field to obtain a plurality of different images that correspond to different position coordinates, each image having information of at least a portion of the sample; and
(c) an image processor that automatically detects a target of interest on the sample from the different images of the sample by automatically measuring one or more parameters of the sample and automatically comparing the measured parameters against selected threshold values of the parameters for the target of interest.

21. The system of claim 20, wherein the slide handling mechanism further comprises an input module that includes:
an input hopper that has a guide key protruding from a side of the input hopper to align a keyway cutout of each of the slide carriers.

22. The system of claim 21, wherein the slide handling mechanism further comprises an output module that includes:
an unloading platform that holds the slide carriers after the scanning;
an output hopper that is configured to receive the slide carriers from the unloading platform; and
an unloading subassembly that rotates the unloading platform about a shaft, causing the slide carriers to be released into the output hopper.

23. The system of claim 22, wherein the slide handling mechanism further comprises a drive belt that has teeth to engage a pitch rack of the slide carriers to transport the slide carriers from the input module to the output module.

24. A system for histological reconstruction of a sample, comprising:
 (a) a slide feed mechanism that provides a sample of a biological specimen on a series of slides, wherein consecutive samples on said slides are:
  (1) stained by a nuclear stain which includes hematoxylin and eosin (H/E), or
  (2) detectably labeled by an immunohistochemistry (IHC) method and counterstained, or
  (3) detectably labeled by an in situ hybridization (ISH) method and counterstained, or
  (4) detectably labeled by a combined (IHC) and (ISH) method and counterstained;
 (b) a microscope subsystem that automatically obtains a sample image from each of the samples by scanning the slides through an imaging field; and
 (c) an image processor that
  (1) automatically reconstructs the sample images to produce a single image frame in which a first sample image is paired with a consecutive sample having a corresponding image;
  (2) automatically performs a histological reconstruction of the specimen; and
  (3) automatically detects one or more targets of interest on the sample from the different sample images by automatically measuring one or more parameters of the sample associated with at least one of said stained and said labeled techniques in (a) and automatically comparing the measured parameters against selected threshold values of the parameters for the one or more targets of interest.

25. The system of claim 24, wherein the first sample and consecutive sample have overlapping images.

26. The system of claim 24, wherein the one or more parameters include the hue, saturation, or intensity of a color image of the sample.

27. The system of claim 24, wherein the image processor is configured to:
 receive a first set of the sample images and a first single image frame from reconstructing the first set at a first magnification;
 receive a second set of the sample images at a second magnification greater than the first magnification;
 use the first single image frame to identify a target therein; and
 use the second set of the samples images to extract desired information about the target.

* * * * *